US012645693B2

(12) United States Patent
Parmentier et al.

(10) Patent No.: US 12,645,693 B2
(45) Date of Patent: Jun. 2, 2026

(54) SYSTEMS AND METHODS FOR GENERATING A TARGET DATASET HAVING A TARGET DATA FORMAT ON A USER DEVICE

(71) Applicant: OVH, Roubaix (FR)

(72) Inventors: Laurent Parmentier, Marcq-En-Baroeul (FR); Olivier Nicol, Tourcoing (FR); Clement Bataille, Lille (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 17/825,323

(22) Filed: May 26, 2022

(65) Prior Publication Data

US 2022/0382562 A1 Dec. 1, 2022

(30) Foreign Application Priority Data

May 27, 2021 (EP) .................................... 21305706

(51) Int. Cl.
*G06F 9/445* (2018.01)
*G06F 16/25* (2019.01)
(Continued)

(52) U.S. Cl.
CPC ........... *G06F 16/258* (2019.01); *G06N 20/00* (2019.01)

(58) Field of Classification Search
CPC .. G06F 16/258; G06F 9/44505; G06F 16/254; G06F 18/22; G06F 16/2455;
(Continued)

(56) References Cited

U.S. PATENT DOCUMENTS 6,477,522 B1 * 11/2002 Young ................... G06F 9/5044
709/224
6,694,362 B1 * 2/2004 Secor ...................... H04L 41/22
705/28
(Continued)

FOREIGN PATENT DOCUMENTS

EP 3343402 A1 7/2018
WO 2016138609 A1 9/2016

OTHER PUBLICATIONS

Extended European Search Report with regard to the counterpart EP Patent Application No. 21305706.0 completed Nov. 9, 2021.
(Continued)

*Primary Examiner* — Muhammad Raza
(74) *Attorney, Agent, or Firm* — BCF LLP

(57) ABSTRACT

A method for sharing a source dataset between a first user device and a second user device, the method being executed by a first processor communicably connected to the first user device. The method includes accessing a configuration file having instruction sets enabling retrieval of source datasets stored respectively in corresponding data storage services; receiving an indication from the first user device including a selected source dataset from the source datasets, and a corresponding selected data storage service from the data storage services; extracting an instruction set corresponding to the selected source dataset; executing the extracted instruction set, and retrieving the selected source dataset onto the first user device; and transferring the configuration file to the second user device to enable the second user device to, when executing the extracted instruction set, retrieve the selected source dataset from the selected data storage service.

10 Claims, 8 Drawing Sheets

700

Accessing a configuration file comprising a plurality of instruction sets for retrieving a plurality of source datasets from a plurality of data storage services — 705

Receiving at least one indication from a user associated with the user device, the at least one indication comprising a selection of at least one source dataset of the plurality of source datasets — 710

Identifying at least one data storage service storing the at least one source dataset in response to receiving the at least one indication — 715

Extracting at least one instruction set of the plurality of instruction sets corresponding to the at least one source dataset — 720

Executing the at least one instruction set to form the target dataset — 725

(51) Int. Cl.
    *G06K 9/62* (2022.01)
    *G06N 20/00* (2019.01)
(58) Field of Classification Search
    CPC ... G06F 16/284; G06F 16/9535; G06N 20/00;
    H04L 67/75
    See application file for complete search history.

(56) References Cited

U.S. PATENT DOCUMENTS

| | | | | | |
|---|---|---|---|---|---|
| 7,197,566 B1* | 3/2007 | Kuzma | H04L 65/612 | | |
| | | | 709/227 | | |
| 7,293,099 B1* | 11/2007 | Kalajan | G06F 16/10 | | |
| | | | 709/219 | | |
| 7,395,255 B2* | 7/2008 | Li | G06F 16/252 | | |
| 7,565,489 B2* | 7/2009 | Mullender | G06F 16/9574 | | |
| | | | 711/118 | | |
| 7,584,220 B2* | 9/2009 | Bozeman | G06F 16/13 | | |
| 7,721,152 B1* | 5/2010 | Joshi | G06F 11/0709 | | |
| | | | 714/25 | | |
| 7,865,606 B1* | 1/2011 | Tewes | H04L 69/326 | | |
| | | | 709/227 | | |
| 8,260,881 B1* | 9/2012 | Paleja | H04L 63/0823 | | |
| | | | 709/217 | | |
| 8,356,277 B1* | 1/2013 | Bank | G06F 9/45529 | | |
| | | | 717/111 | | |
| 8,544,098 B2* | 9/2013 | Gustave | G06F 21/577 | | |
| | | | 709/224 | | |
| 8,713,076 B2* | 4/2014 | Martin | G06F 16/25 | | |
| | | | 707/811 | | |
| 8,983,954 B2* | 3/2015 | Platt | G06F 16/38 | | |
| | | | 707/736 | | |
| 9,137,331 B2* | 9/2015 | Seaman | H04L 67/1095 | | |
| 9,270,724 B1* | 2/2016 | Morgan | H04W 12/033 | | |
| 9,720,958 B2* | 8/2017 | Bagehorn | G06F 16/244 | | |
| 10,540,358 B2* | 1/2020 | Wu | G06F 16/24578 | | |
| 10,699,027 B2* | 6/2020 | Jacob | G06F 16/252 | | |
| 10,715,570 B1* | 7/2020 | Feinstein | G06N 5/01 | | |
| 10,719,313 B2* | 7/2020 | Kuan | G06F 9/4494 | | |
| 10,740,304 B2* | 8/2020 | Fokoue-Nkoutche | | | |
| | | | G06F 16/2282 | | |
| 10,838,970 B2* | 11/2020 | Scolnick | G06F 16/248 | | |
| 10,878,144 B2* | 12/2020 | Nendorf | G06F 9/46 | | |
| 11,032,160 B1* | 6/2021 | Raheja | H04L 41/0843 | | |
| 11,182,221 B1* | 11/2021 | Sivaramakrishnan | G06F 30/34 | | |
| 11,182,264 B1* | 11/2021 | Sivaramakrishnan | G06F 9/547 | | |
| 11,348,032 B1* | 5/2022 | Van Gael | G06F 8/31 | | |
| 11,599,813 B1* | 3/2023 | Yuan | G06N 20/00 | | |
| 11,636,161 B1* | 4/2023 | Chang | G06F 16/906 | | |
| | | | 707/737 | | |
| 11,829,890 B2* | 11/2023 | Zhang | G06N 5/01 | | |
| 11,914,606 B2* | 2/2024 | Jalalibarsari | G06F 16/2456 | | |
| 12,045,698 B1* | 7/2024 | May | G06F 8/35 | | |
| 12,530,145 B2* | 1/2026 | Capelo | G06F 3/0644 | | |
| 2001/0047401 A1* | 11/2001 | McTernan | H04L 12/1877 | | |
| | | | 709/219 | | |
| 2002/0026441 A1* | 2/2002 | Kutay | G06Q 10/101 | | |
| | | | 707/999.005 | | |
| 2002/0147769 A1* | 10/2002 | Levitan | H04N 21/4782 | | |
| | | | 709/217 | | |
| 2002/0178261 A1* | 11/2002 | Chang | H04L 67/1061 | | |
| | | | 709/225 | | |
| 2003/0126236 A1* | 7/2003 | Marl | H04L 67/59 | | |
| | | | 709/220 | | |
| 2003/0172073 A1* | 9/2003 | Brodsky | G06F 16/258 | | |
| 2004/0024900 A1* | 2/2004 | Breiter | H04N 21/25808 | | |
| | | | 709/225 | | |
| 2004/0148371 A1* | 7/2004 | Lin | H04L 67/34 | | |
| | | | 700/2 | | |
| 2004/0181753 A1* | 9/2004 | Michaelides | G06F 16/258 | | |
| | | | 715/249 | | |
| 2004/0224674 A1* | 11/2004 | O'Farrell | G06F 16/27 | | |
| | | | 455/418 | | |

| | | | | | |
|---|---|---|---|---|---|
| 2005/0044164 A1* | 2/2005 | O'Farrell | G06F 16/25 | | |
| | | | 709/213 | | |
| 2005/0044165 A1* | 2/2005 | O'Farrell | G06F 16/273 | | |
| | | | 709/213 | | |
| 2005/0044229 A1* | 2/2005 | Brown | H04L 67/10 | | |
| | | | 709/226 | | |
| 2005/0125660 A1* | 6/2005 | Raciborski | H04L 63/0428 | | |
| | | | 713/161 | | |
| 2005/0188334 A1* | 8/2005 | Shah | G06F 30/30 | | |
| | | | 716/102 | | |
| 2005/0213722 A1* | 9/2005 | Stormon | H04M 15/00 | | |
| | | | 379/112.01 | | |
| 2006/0014521 A1* | 1/2006 | Chen | H04M 1/72403 | | |
| | | | 455/410 | | |
| 2006/0047648 A1* | 3/2006 | Martin | G06F 16/25 | | |
| 2006/0095585 A1* | 5/2006 | Meijs | H04L 61/4511 | | |
| | | | 709/245 | | |
| 2006/0168318 A1* | 7/2006 | Twiss | H04L 67/1093 | | |
| | | | 709/238 | | |
| 2006/0212542 A1* | 9/2006 | Fang | H04L 67/104 | | |
| | | | 709/219 | | |
| 2006/0212584 A1* | 9/2006 | Yu | H04L 67/1072 | | |
| | | | 709/227 | | |
| 2006/0242318 A1* | 10/2006 | Nettle | G06F 9/505 | | |
| | | | 707/E17.032 | | |
| 2007/0047279 A1* | 3/2007 | Evans | G06F 9/541 | | |
| | | | 365/1 | | |
| 2007/0143182 A1* | 6/2007 | Faber | G06Q 30/0257 | | |
| | | | 705/14.71 | | |
| 2007/0230679 A1* | 10/2007 | Altberg | H04L 63/0428 | | |
| | | | 379/218.01 | | |
| 2008/0046434 A1* | 2/2008 | Nelson | G06F 21/6218 | | |
| | | | 707/999.009 | | |
| 2008/0133538 A1* | 6/2008 | Chavez | H04L 67/104 | | |
| 2008/0133666 A1* | 6/2008 | Chavez | H04L 67/06 | | |
| | | | 709/205 | | |
| 2008/0133698 A1* | 6/2008 | Chavez | H04L 67/06 | | |
| | | | 709/217 | | |
| 2008/0133706 A1* | 6/2008 | Chavez | H04L 67/104 | | |
| | | | 709/218 | | |
| 2008/0155574 A1* | 6/2008 | Gohel | G06F 9/541 | | |
| | | | 719/328 | | |
| 2008/0256175 A1* | 10/2008 | Lee | H04L 67/1072 | | |
| | | | 709/203 | | |
| 2009/0094347 A1* | 4/2009 | Ting | G06Q 10/00 | | |
| | | | 709/219 | | |
| 2009/0222511 A1* | 9/2009 | Hays | G06F 40/186 | | |
| | | | 709/203 | | |
| 2011/0010258 A1* | 1/2011 | Chavez | G06Q 30/0641 | | |
| | | | 705/26.1 | | |
| 2011/0010421 A1* | 1/2011 | Chavez | H04L 12/6418 | | |
| | | | 709/219 | | |
| 2011/0264903 A1* | 10/2011 | Lin | H04L 61/50 | | |
| | | | 713/2 | | |
| 2012/0084643 A1* | 4/2012 | Govindan | G06F 40/151 | | |
| | | | 715/255 | | |
| 2012/0102151 A1* | 4/2012 | Souza | H04L 69/14 | | |
| | | | 709/217 | | |
| 2012/0123866 A1* | 5/2012 | Li | G06Q 30/00 | | |
| | | | 705/14.55 | | |
| 2012/0324090 A1* | 12/2012 | Gu | H04L 67/1097 | | |
| | | | 709/223 | | |
| 2013/0054571 A1* | 2/2013 | Sharma | G06F 16/25 | | |
| | | | 707/E17.044 | | |
| 2013/0054639 A1* | 2/2013 | Sharma | G06F 16/11 | | |
| | | | 707/E17.014 | | |
| 2013/0117413 A1* | 5/2013 | Kaneko | H04N 21/4622 | | |
| | | | 709/217 | | |
| 2013/0304724 A1* | 11/2013 | Rosjat | G06F 16/2455 | | |
| | | | 707/E17.014 | | |
| 2014/0020034 A1* | 1/2014 | Manchester | H04N 21/23439 | | |
| | | | 725/86 | | |
| 2014/0026115 A1* | 1/2014 | Bank | G06F 8/38 | | |
| | | | 717/113 | | |

(56) References Cited

U.S. PATENT DOCUMENTS

| | | | | |
|---|---|---|---|---|
| 2014/0052822 | A1* | 2/2014 | Rodriguez Rodriguez | H04L 67/568 709/218 |
| 2014/0129583 | A1* | 5/2014 | Munkes | G06F 16/9032 707/760 |
| 2014/0172979 | A1* | 6/2014 | El-Beltagy | H04L 67/1046 709/204 |
| 2014/0189076 | A1* | 7/2014 | Creasman | H04L 41/0806 709/220 |
| 2014/0282851 | A1* | 9/2014 | Miller | H04L 67/75 726/1 |
| 2014/0297774 | A1* | 10/2014 | Munupalle | H04L 41/082 709/208 |
| 2015/0067819 | A1* | 3/2015 | Shribman | H04L 67/06 709/218 |
| 2015/0074193 | A1* | 3/2015 | Wouhaybi | H04L 67/06 709/204 |
| 2015/0088964 | A1* | 3/2015 | Shiell | G06F 12/126 709/203 |
| 2015/0172416 | A1* | 6/2015 | Morancy | H04L 67/1097 709/219 |
| 2015/0280996 | A1* | 10/2015 | Berube | H04L 41/0853 709/224 |
| 2016/0156517 | A1* | 6/2016 | Singh | G06F 9/541 709/223 |
| 2017/0193066 | A1* | 7/2017 | Zhu | G06F 16/254 |
| 2017/0193392 | A1* | 7/2017 | Liu | G06N 20/00 |
| 2018/0144034 | A1* | 5/2018 | Das | H04W 84/18 |
| 2018/0278724 | A1* | 9/2018 | Erdelyi | H04L 67/06 |
| 2019/0052643 | A1* | 2/2019 | Doshi | G06N 5/04 |
| 2019/0056931 | A1* | 2/2019 | Ding | G06F 8/71 |
| 2019/0108258 | A1* | 4/2019 | Poor | G06F 16/904 |
| 2019/0121566 | A1* | 4/2019 | Gold | G06F 3/067 |
| 2019/0156927 | A1* | 5/2019 | Virkar | G16H 15/00 |
| 2019/0340521 | A1* | 11/2019 | Liu | G06F 16/00 |
| 2019/0378052 | A1* | 12/2019 | Badhwar | G06N 3/0455 |
| 2019/0391800 | A1* | 12/2019 | Lin | G06F 8/65 |
| 2020/0019558 | A1* | 1/2020 | Okorafor | G06F 21/6254 |
| 2020/0026710 | A1* | 1/2020 | Przada | G06N 20/00 |
| 2020/0065091 | A1* | 2/2020 | Monet | G06F 9/44505 |
| 2020/0104123 | A1* | 4/2020 | Laschet | G06N 20/00 |
| 2020/0167593 | A1* | 5/2020 | Kim | G06N 3/105 |
| 2020/0174803 | A1* | 6/2020 | Kautzleben | G06F 16/252 |
| 2021/0097439 | A1* | 4/2021 | Vodencarevic | G06F 8/71 |
| 2021/0334251 | A1* | 10/2021 | Mire | G06F 16/221 |
| 2021/0334593 | A1* | 10/2021 | Vo | G06N 7/01 |
| 2021/0336839 | A1* | 10/2021 | He | H04L 67/51 |
| 2021/0337420 | A1* | 10/2021 | Lo | H04L 41/16 |
| 2021/0390424 | A1* | 12/2021 | Vo | G06Q 30/0185 |
| 2021/0400107 | A1* | 12/2021 | Dai | H04L 67/1063 |
| 2022/0035689 | A1* | 2/2022 | Raheja | G06F 9/5011 |
| 2022/0048185 | A1* | 2/2022 | Miller | G05B 13/0265 |
| 2022/0048191 | A1* | 2/2022 | Miller | B25J 9/161 |
| 2022/0058034 | A1* | 2/2022 | Grohoski | G06F 9/44505 |
| 2022/0083659 | A1* | 3/2022 | Ma | G06N 20/20 |
| 2022/0107744 | A1* | 4/2022 | Capelo | G06N 20/00 |
| 2022/0156633 | A1* | 5/2022 | Anwar | H04L 67/10 |
| 2022/0164240 | A1* | 5/2022 | Kim | G06F 9/5027 |
| 2022/0261631 | A1* | 8/2022 | Cohen | G06N 3/0895 |
| 2022/0351079 | A1* | 11/2022 | Schuster | G06N 3/09 |

OTHER PUBLICATIONS

Masseroli et al., "Processing of big heterogeneous genomic datasets for tertiary analysis of Next Generation Sequencing data", Bioinformatics 35, No. 5, pp. 1-7.
Diogo Munaro Vieira, "Dataset Manager", https://pypi.org/project/dataset-manager/ accessed on May 25, 2022, pdf 7 pages.
MIT Data To AI Lab, "D3M Dataset Manager", https://pypi.org/project/d3m-dataset-manager/ accessed on May 25, 2022, pdf 7 pages.
MLBazaar/MLPrimitives, "MLBazaar/MLPrimitives", https://github.com/MLBazaar/MLPrimitives accessed on May 25, 2022, pdf 8 pages.
MLBazaar/MLBlocks, "MLBlocks", https://github.com/MLBazaar/MLBlocks accessed on May 25, 2022, pdf 5 pages.
Wikipedia "Feature extraction", https://en.wikipedia.org/wiki/Feature_extraction accessed on May 25, 2022, pdf 3 pages.
MLBazaar/MLPrimitives, "MLPrimitives", https://github.com/MLBazaar/MLPrimitives/blob/master/mlprimitives/datasets.by accessed on May 25, 2022, pdf 12 pages.

* cited by examiner

User Device 2

System 5

Communication Network 4

Data Storage Service 7₁

Data Storage Service 7₂

Data Storage Service 7₃

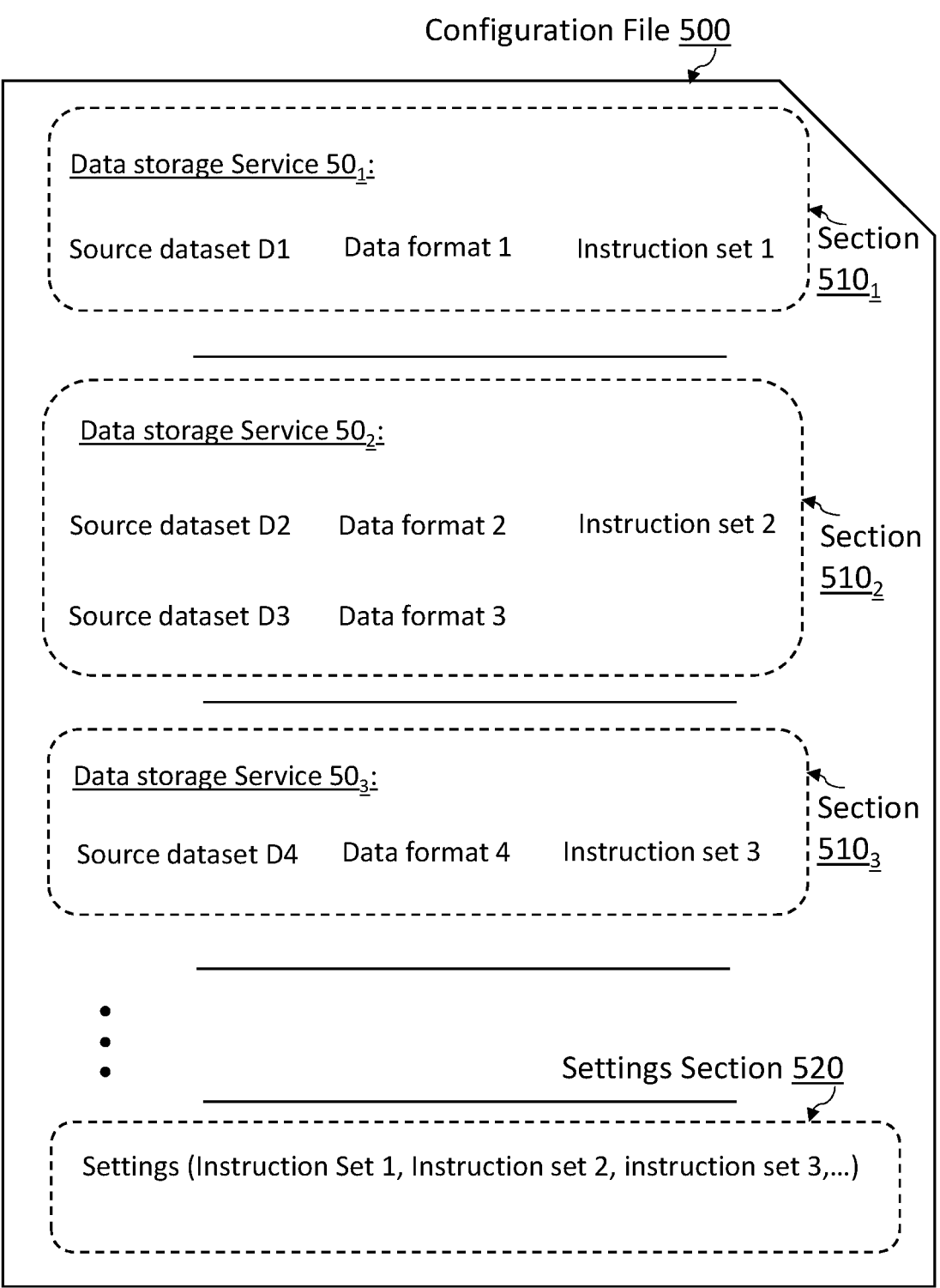

Configuration File 500

Data storage Service $50_1$:

Source dataset D1     Data format 1     Instruction set 1     Section $510_1$

Data storage Service $50_2$:

Source dataset D2     Data format 2     Instruction set 2     Section $510_2$

Source dataset D3     Data format 3

Data storage Service $50_3$:

Source dataset D4     Data format 4     Instruction set 3     Section $510_3$

Settings Section 520

Settings (Instruction Set 1, Instruction set 2, instruction set 3,...)

Figure 7:
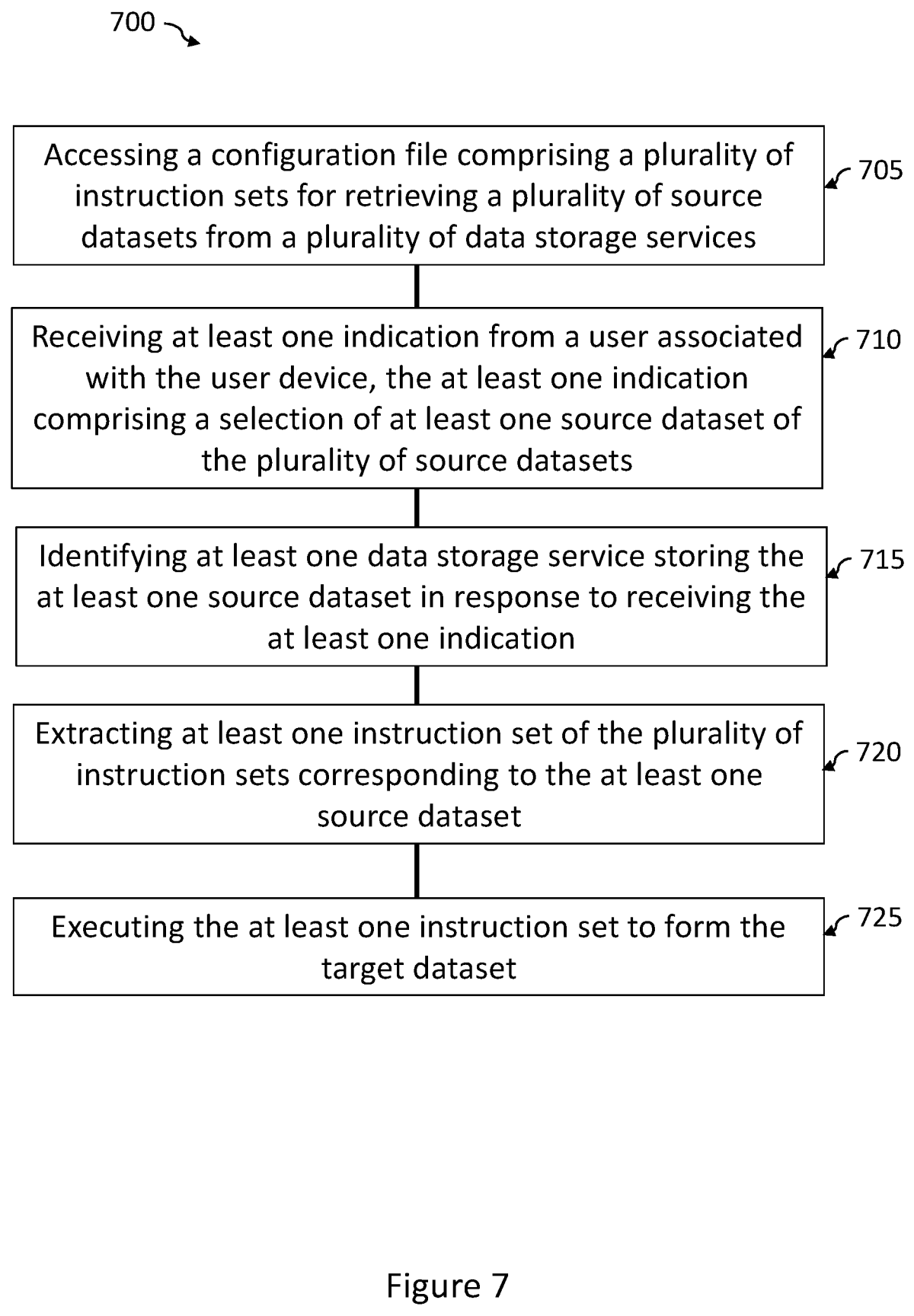

Accessing a configuration file comprising a plurality of instruction sets for retrieving a plurality of source datasets from a plurality of data storage services    705

Receiving at least one indication from a user associated with the user device, the at least one indication comprising a selection of at least one source dataset of the plurality of source datasets    710

Identifying at least one data storage service storing the at least one source dataset in response to receiving the at least one indication    715

Extracting at least one instruction set of the plurality of instruction sets corresponding to the at least one source dataset    720

Executing the at least one instruction set to form the target dataset    725

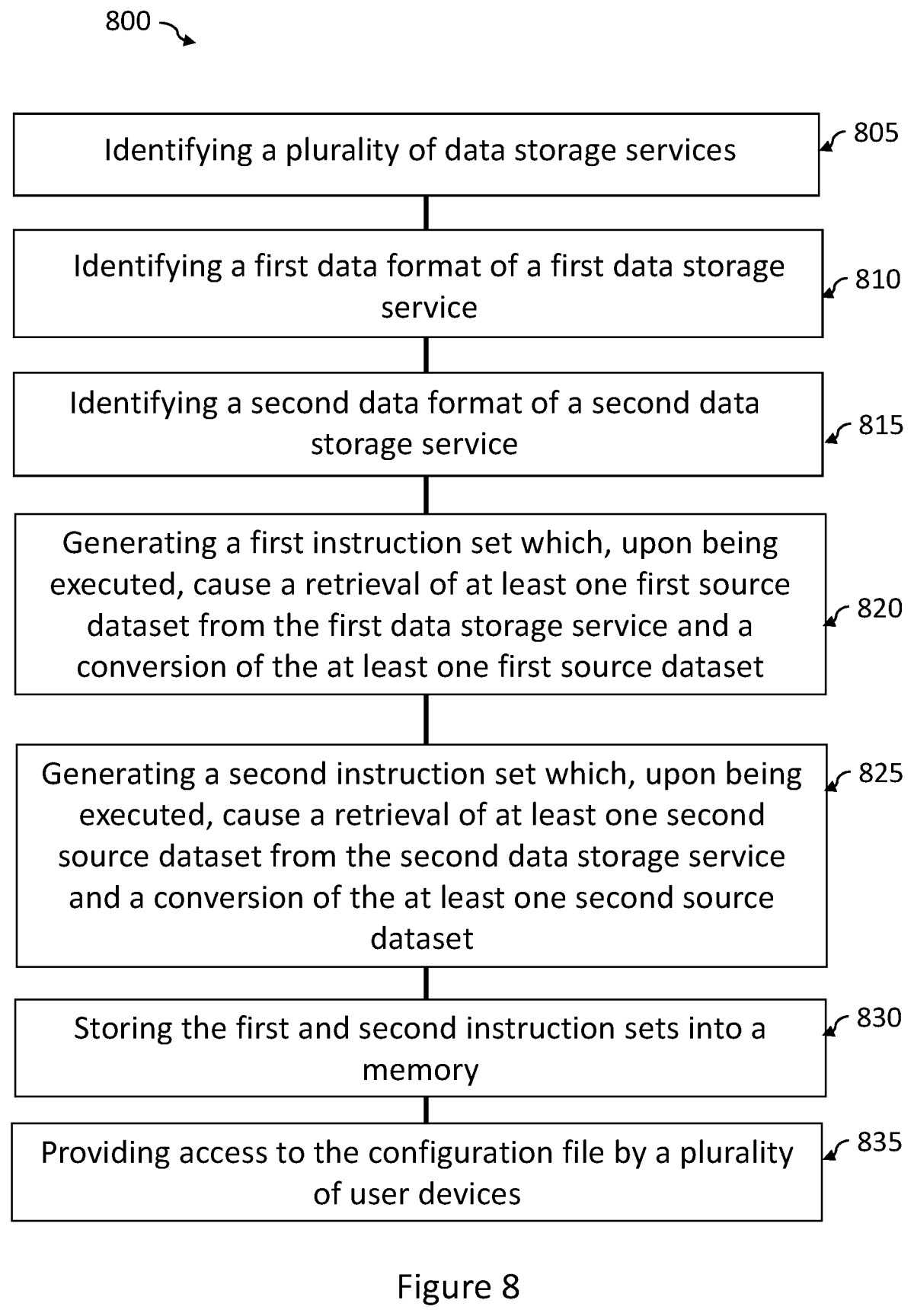

| Identifying a plurality of data storage services | 805 |

| Identifying a first data format of a first data storage service | 810 |

| Identifying a second data format of a second data storage service | 815 |

| Generating a first instruction set which, upon being executed, cause a retrieval of at least one first source dataset from the first data storage service and a conversion of the at least one first source dataset | 820 |

| Generating a second instruction set which, upon being executed, cause a retrieval of at least one second source dataset from the second data storage service and a conversion of the at least one second source dataset | 825 |

| Storing the first and second instruction sets into a memory | 830 |

| Providing access to the configuration file by a plurality of user devices | 835 |

Figure 8

SYSTEMS AND METHODS FOR GENERATING A TARGET DATASET HAVING A TARGET DATA FORMAT ON A USER DEVICE

CROSS-REFERENCE

The present application claims priority to European Patent Convention Application No. 21305706.0, entitled "Systems and Methods for Generating a Target Dataset Having a Target Data Format on a User Device," filed on May 27, 2021, the entirety of which is incorporated herein by reference.

FIELD

The present technology relates to systems and methods for data processing. In particular, a system and methods for generating a target dataset having a target data format on a user device are disclosed.

BACKGROUND

Data storage services are common in data intensive applications involving high amount of heterogeneous data such as, for example, scientific big data applications in academia and industry. However, source datasets distributed across the data storage services may not have a data format suitable for a specific application of an end user. For example, a user may download a dataset under the .csv data format from openml.org, which may not be a suitable data format for the user's application.

In a more general aspect, users have to learn (e.g. read the documentation related to the data storage service) and execute instructions for retrieving a source dataset from a specific data storage service. If a given user desires to retrieve source datasets from a plurality of data storage services, he has to learn and execute instructions for each data storage services, which may be a time-consuming and cumbersome task.

Many technologies attempt to address this problem by using computer-implemented platforms which cannot provide access to a plurality of data storage services and/or are not suitable for collaborative work between users.

Therefore, even though the recent developments identified above may provide benefits, improvements are still desirable.

SUMMARY

Implementations of the present technology have been developed at least in part based on developers' appreciation of shortcomings associated with the prior art. Developers of the present technology have devised methods and systems for generating a target dataset having a target data format on a user device, the target dataset being formed by retrieving a plurality of source datasets distributed across a plurality of data storage services using a configuration file.

The increasing number of machine learning models trained with high amount of training datasets is one application among many other that rely on data storage services. For example, datahub.io and openml.org are two platforms enabling users, such as data scientists, to retrieve training datasets for training machine learning models. Those platforms provide the users with vast amount and variety of source.

Referring to FIG. 1, there is shown a schematic diagram of a system 5 for retrieving source datasets by a user device 2 according to some implementations disclosed in the prior art. The user device 2 is communicatively coupled with a plurality of data storage services $7_i$ over a communication network 4. The data storage services $7_i$ store source datasets, one or more of which a user of the user device 2 may desire to utilise. As such, the data storage services $7_i$ are also referred to as "repositories".

In order to retrieve the source datasets distributed across the data storage services $7_1$, the user has to learn for the instruction sets to be executed to retrieve source datasets from each data storage services $7_i$ to generate a target dataset. In other words, if the user desires to retrieve a first source dataset from the data storage service $7_1$, a second source dataset from the data storage service $7_2$, and a third source dataset from the data storage service $7_3$, the user has to learn and execute three instruction sets, each instruction set corresponding to one of the data storage services $7_1$.

Moreover, if a second user using a second user device (not shown) desires to retrieve the same source datasets as the first user (i.e. generating the target dataset on the second user device), the second user has to learn and execute the three instruction sets as well. In some cases, the second user could acquire such a dataset from another end user. This could be problematic, however, due to differences in retrieving and treating the source dataset by the end user. The second user may eventually end up with results influenced by changes affected on the source dataset before transfer to the second user (e.g. converted into a same data format but with two different converting tools). Therefore, a retrieving process executed by the users on the source dataset may induce biases in the users' applications. A solution to address this problem is to share the original dataset from one of the users to the other one. This is also a time-consuming task due to high amount of data usually comprised in the datasets. There is thus a need for a collaborative system that may enable two users to obtain mirror images of a same datasets without requiring the user to share the dataset among themself. As the configuration file provides instructions for both retrieving and converting the source datasets, the end user can work with heterogenous storage management and a plurality of different source file types.

In one implementation, the method comprises receiving, by a processor, a configuration file comprising a plurality of instruction sets for retrieving source datasets from one or more data storage services. In other words, the configuration file comprises information about how to retrieve the source datasets based on which data storage service stores them. The plurality of instructions may be executed in parallel such that two datasets stored in two different data storage service may be retrieved on the user device upon receiving one command from the user, as will be described in greater detail below. The method further comprises receiving at least one indication from the user, the at least one indication comprising a selection of at least one source dataset. In response to receiving the at least one indication, at least one data storage service storing the at least one source dataset is identified. At least one instruction set is further extracted from the configuration file and executed to retrieve the at least one source dataset, thereby forming the target dataset.

Developers of the present technology have realized that such configuration file may be shareable such that a first user may transmit the configuration file to a second user, such that different users can efficiently retrieve and prepare datasets from data storage services, without requiring large sets of data to be transferred from user to user nor requiring intermediate storage of treated datasets. Therefore, a second user device associated with the second user may execute the configuration file such that a copy of the target dataset is generated on the second user device. As such, the first user only has to transmit the configuration file to the second user so that the second user may retrieve the same source datasets than the first user, without transferring said source datasets between the first user device and the second user device. More specifically, as it will be described below, the configuration file may be updated with specific settings by the first user such that the second user is provided with a specific manner to retrieve the source datasets from the data storage services.

The user device, the configuration file and the plurality of data storage services communicably connected to the user device over a communication network may be referred to as a data processing system. In at least some implementations of the present technology, the data processing system may be a "commercially-oriented" data processing system. Broadly speaking, a given commercially-oriented data processing system may be of use to users that desire to access and retrieve source datasets from the data storage services via a respective user device. For example, the users may seek for training a machine learning model and/or fetching source datasets. Hence, users of such a system may be provided with said configuration file for enabling the corresponding user device to generate a target dataset based on the source datasets upon receiving at least one indication from the user.

In a first broad aspect of the present technology, there is provided a method for generating a target dataset having a target data format on a user device, the method being executable by a processor communicably connected to the user device. The method comprises accessing, by the processor, a configuration file comprising a plurality of instruction sets for retrieving a plurality of source datasets from a plurality of data storage services, the plurality of source datasets being distributed across the plurality of data storage services, at least two of the plurality of source datasets having different data formats from each other. Each one of the plurality of instruction sets is configured to, upon being executed, cause a retrieval of a corresponding one of the plurality of source datasets from a corresponding one of the data storage services. The method comprises receiving, by the processor, at least one indication from a user associated with the user device, the at least one indication comprising a selection of at least one source dataset of the plurality of source datasets, identifying, by the processor, at least one data storage service storing the at least one source dataset in response to receiving the at least one indication, extracting, by the processor from the configuration file, at least one instruction set of the plurality of instruction sets, the at least one instruction set corresponding to the at least one source dataset, and executing, by the processor, the at least one instruction set to form the target dataset, executing the at least one instruction set comprising retrieving the at least one source dataset from the at least one data storage service.

In some implementations of the present technology, the at least one indication includes a selection of the target data format among a plurality of target data formats, and executing the at least one instruction set further comprises converting the at least one source dataset into the target data format.

In some implementations of the present technology, converting the at least one source dataset into the target data format comprises at least one of: converting the at least one source dataset into a desired file type, and converting the at least one source dataset into a desired data formatting style.

In some implementations of the present technology, the method further comprises providing, by the processor, the target dataset to a machine learning model for training thereof based on the target dataset.

In some implementations of the present technology, the at least one source dataset is a first source dataset, the target dataset is a first target dataset, and the method further comprises forming a second target dataset based on a second source dataset, and providing the second target dataset to the machine learning model for training thereof based on the first and second target datasets.

In some implementations of the present technology, retrieving the at least one source dataset from the at least one data storage service comprises selecting one of a plurality of source datasets stored in the at least one data storage service.

In some implementations of the present technology, the at least one indication includes a data requirement, and retrieving the at least one source dataset from the at least one data storage service comprises selecting the dataset according to the data requirement.

In some implementations of the present technology, the at least one indication includes a metadata requirement, and retrieving the at least one source dataset from the at least one data storage service comprises selecting the dataset according to the metadata requirement.

In some implementations of the present technology, the at least one source dataset identified by the at least one indication includes a first source dataset and a second source dataset, the first source dataset is stored in a first data storage service of the plurality of data storage sets, the second source dataset is stored in a second data storage service of the plurality of data storage sets, and executing the at least one instruction set to form the target dataset comprises executing a first instruction set of the plurality of instruction sets corresponding to the first data storage service, and executing a second instruction set of the plurality of instruction sets corresponding to the second data storage service.

In some implementations of the present technology, the first source dataset has a first data format and the second source dataset has a second data format different from the first data format, the at least one indication comprising information about a selection of the target data format selected by the user among a plurality of target data formats, the method further comprising converting, by the processor, the first source dataset from the first data format to the target data format and the second source dataset from the second data format to the target data format.

In some implementations of the present technology, the user device is a first user device associated with a first user, the method further comprising transmitting, by the processor to a second user device, the configuration file such that the instruction sets are executable by the second user device and, thereby, that a copy of the target dataset is generatable on the second user device.

In a second broad aspect of the present technology, there is provided a method for generating a configuration file for retrieving a plurality of source datasets for a user device. The method comprises identifying a plurality data storage services, the source datasets being distributed across the plurality of data storage services, at least two of the plurality of source datasets having different data formats from each other, identifying a first data format of a first data storage service, identifying a second data format of a second data storage service, generating a first instruction set which, upon being executed, causes retrieval of at least one first source dataset from the first data storage service to the user device and a conversion of the at least one first source dataset from the first data format to at least one target data format, generating a second instruction set which, upon being executed, causes retrieval of at least one second source dataset from the second data storage service to the user device and a conversion of the at least one second source dataset from the second data format to the at least one target data format, and storing the first and second instruction sets into a memory of the user device, thereby forming the configuration file.

In some implementations of the present technology, the method further comprises providing access to the configuration file by a plurality of user devices, each user device being associated with a user.

In some implementations of the present technology, the user device is a first user device associated with a first user; and the method further comprises transmitting the configuration file to a second user device such that the first and second sets of instructions are executable by the second user device.

In yet another broad aspect of the present technology, there is provided a data processing system for generating a target dataset on a user device based on a plurality of source datasets distributed across a plurality of data storage services, at least two of the plurality of source datasets having different data formats from each other, the data processing system comprising a processor and a memory configured to store instructions which, upon being executed by the processor, cause the server to perform the aforementioned methods.

In yet another broad aspect of the present technology, there is provided a method for sharing a source dataset between a first user device and a second user device, the method being executed by a first processor communicably connected to the first user device, the method including accessing a configuration file comprising instruction sets enabling retrieval of at least two source datasets stored respectively in at least two corresponding data storage services; receiving an indication from a user associated with the first user device comprising a selected source dataset from the at least two source datasets, and a corresponding selected data storage service from the least two data storage services; extracting, from the configuration file, an instruction set corresponding to the selected source dataset; executing the extracted instruction set, and retrieving the selected source dataset from the selected data storage service onto the first user device; and transferring the configuration file to the second user device to enable the second user device to, when executing the extracted instruction set, retrieve the selected source dataset from the selected data storage service.

In some embodiments, the method further includes extracting, from the configuration file and by a second processor communicably connected to the second user device, the instruction set corresponding to the selected source dataset; executing, by the second processor, the extracted instruction set, and retrieving the selected source dataset from the selected data storage service onto the second user device; providing, by the first processor, the selected source dataset retrieved on the first user device to a first machine learning model for training thereof; and providing, by the second processor, the selected source dataset retrieved on the second user device to a second machine learning model for training thereof.

In some embodiments, the selected source dataset is a first selected source dataset from a first selected data storage service; and further including retrieving, by the first processor, a second selected source dataset from a second selected data storage service onto the first user device; retrieving, by the second processor, the second selected source dataset from a second selected data storage service onto the second user device; and providing both of the first and second machine learning models with the second selected source dataset for training thereof.

In some embodiments, the at least two source datasets are stored in the at least two corresponding data storage services, each source dataset being stored with a respective data format, the indication includes a selection of a target data format among a plurality of target data formats; and the instruction set comprises instructions to, when executed, convert the selected source dataset, from a respective data format thereof into the target data format.

In some embodiments, converting the selected source dataset includes at least one of: converting the selected source dataset into a desired file type; and converting the selected source dataset into a desired data formatting style.

In some embodiments, the indication includes a data requirement; and retrieving the at least one source dataset from the at least one data storage service comprises selecting the dataset according to the data requirement.

In some embodiments, the indication includes a metadata requirement; and retrieving the at least one source dataset from the at least one data storage service comprises selecting the dataset according to the metadata requirement.

In yet another broad aspect of the present technology, there is provided a data processing system for retrieving a source dataset on a user device based on a plurality of source datasets distributed across a plurality of data storage services, at least two of the plurality of source datasets having different data formats from each other, the data processing system comprising a processor and a memory configured to store instructions which, upon being executed by the processor, cause the processor to: access a configuration file comprising instruction sets enabling retrieval of at least two source datasets stored respectively in at least two corresponding data storage services; receive an indication from a user associated with the first user device comprising a selected source dataset from the at least two source datasets, and a corresponding selected data storage service from the least two data storage services; extract, from the configuration file, an instruction set corresponding to the selected source dataset; execute the extracted instruction set; retrieve the selected source dataset from the selected data storage service onto the first user device; and transfer the configuration file to the second user device to enable the second user device to, when executing the extracted instruction set, retrieve the selected source dataset from the selected data storage service.

In some embodiments, the processor and the memory are further configured to extract, from the configuration file and by a second processor communicably connected to the second user device, the instruction set corresponding to the selected source dataset; execute, by the second processor, the extracted instruction set, and retrieving the selected source dataset from the selected data storage service onto the second user device; provide, by the first processor, the selected source dataset retrieved on the first user device to a first machine learning model for training thereof; and provide, by the second processor, the selected source dataset retrieved on the second user device to a second machine learning model for training thereof.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "dataset" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a data object with respect to a particular object storage device, or some other means of directing the recipient of the indication to a network location, memory address, database table, or other location where the data object may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 is a schematic representation of a configuration file in accordance with an implementation of the present technology;

FIG. 7 is a flow diagram of a method for generating a target dataset having a target data format on the user device in accordance with an implementation of the present technology; and FIG. 8 is a flow diagram of a method generating the configuration file of FIG. 4 for retrieving a plurality of source datasets in accordance with an implementation of the present technology.

Figure 1:
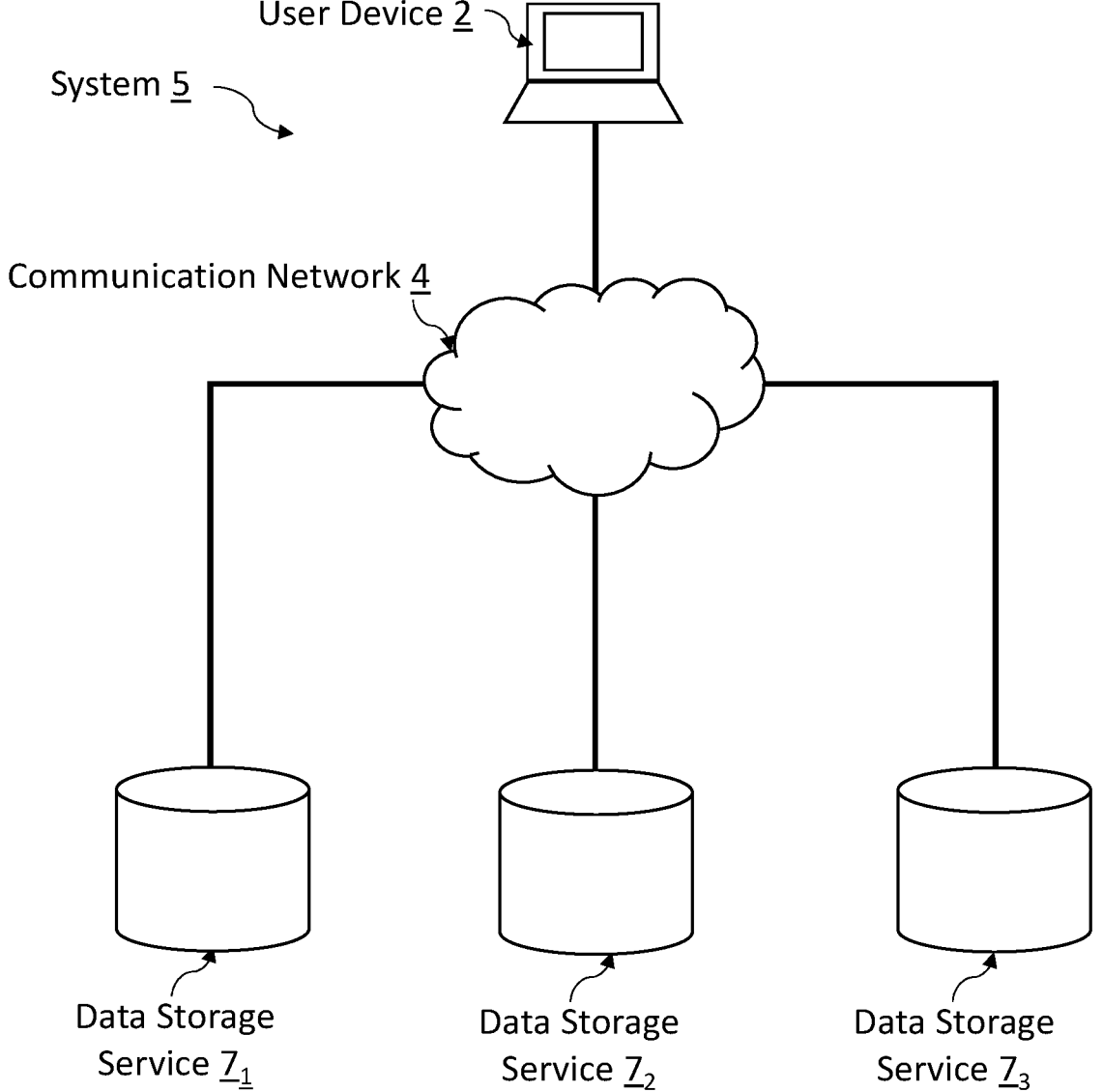
FIG. 1 is a schematic representation of a data processing system as disclosed in the prior art.

It should also be noted that, unless otherwise explicitly specified herein, the drawings may not be drawn to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Figure 2:
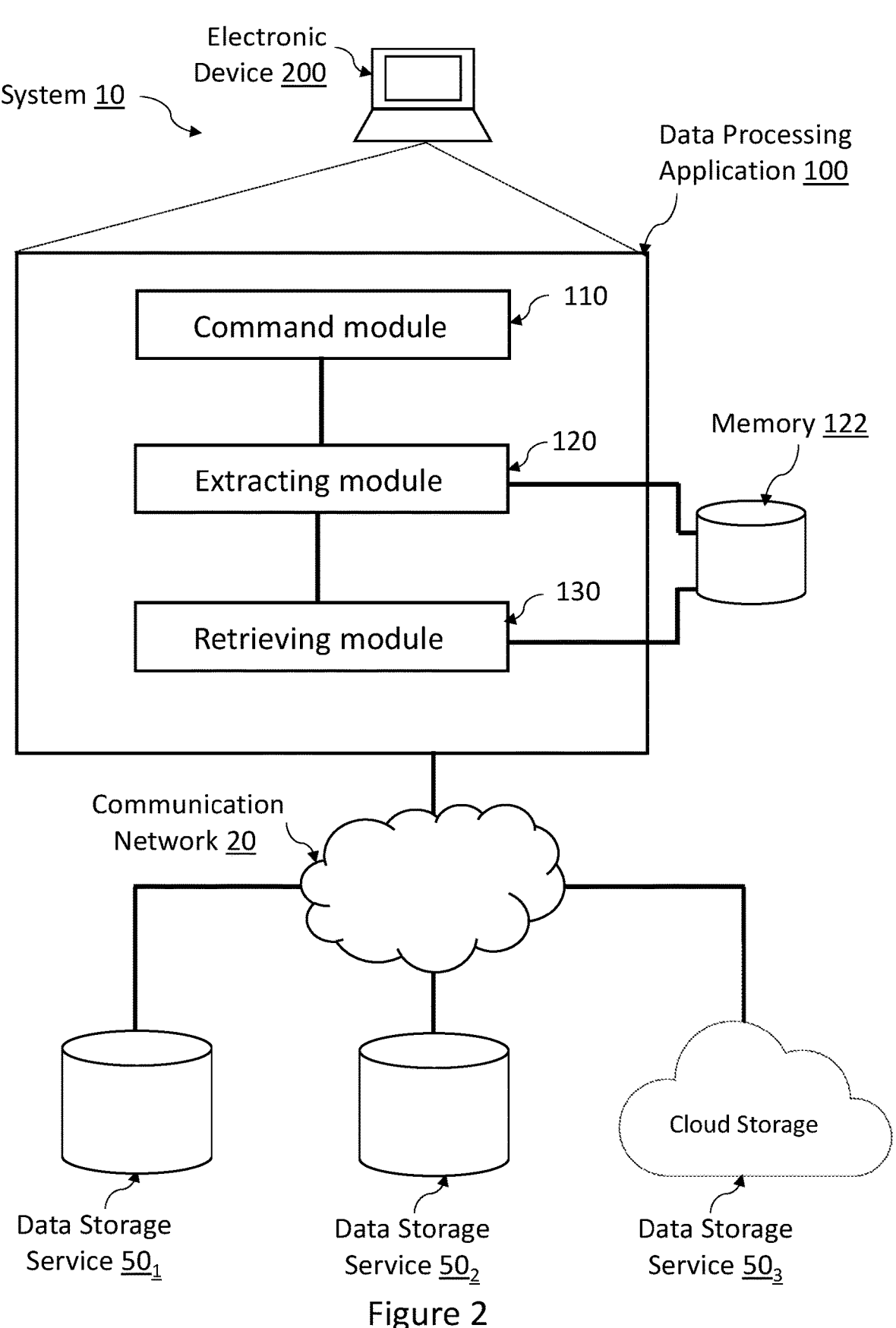
FIG. 2 is a schematic representation of a data processing system in accordance with an implementation of the present technology.

Referring to FIG. 2, there is shown a schematic diagram of a system 10 suitable for implementing non-limiting implementations of the present technology. It is to be expressly understood that the system 10 as depicted is merely an illustrative implementation of the present technology. In some cases, what are believed to be helpful examples of modifications to the system 10 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 10 may provide in certain instances simple implementations of the present technology, and that where such is the case they have been presented in this manner as an aid to understanding. As persons skilled in the art would understand, various implementations of the present technology may be of a greater complexity.

According to the present technology, the system 10 is configured to generate a target dataset having a target data format on a user device. The target dataset is formed from one or more retrieved source datasets, the source datasets being distributed across a plurality of data storage services. The target dataset may be intended to be used, for example, as a training dataset for training a machine learning model.

With reference to FIG. 2, an electronic device 200 is configured to execute instructions of a configuration file 500 (FIG. 4) as described herein further below. In one implementation, said execution could cause the user device 200 to deploy and run a data processing application 100 for retrieving a plurality of source datasets from a plurality of data storage services 50$_i$, the electronic device 200 and the data storage services 50$_i$ being communicably interconnected via a communication network 20. The electronic device may be communicably connected to a different number of data storage services 50. FIG. 2 illustrates three data storage services 50, merely as an aid to understanding, and it is contemplated that more or fewer data storage services 50 could be used. As it will be described in greater detail hereinafter, a processor of the user device 200 receives an indication from the user device entered by the user associated thereto, and execute instruction sets to generate the target dataset on the user device 200. In some implementations, the processor 220 could transmit said indication to the data processing application 100. Depending on the implementation, the data processing application 100 could be implemented as a Software Development Kit (SDK), but other types of implementations are contemplated in alternative implementations.

Furthermore, the system 10 according to a non-limiting implementation of the present technology is a data processing system (also referred to herein as the "data processing system 10"). Retrieved and processed source datasets form the target dataset on the electronic device 200, as will be described further below. The target dataset may be further used by the electronic device 200 as a training dataset to train a machine learning algorithm. As it will be described in greater details herein further below, a plurality of target datasets may be generated by the execution of the instructions comprised in the configuration file on the electronic device 200, such that the machine learning algorithm may be trained based on the plurality of target datasets. However, implementations of the present technology can be equally applied to other types of the system 10 and for other purposes than training of machine learning models.

Figure 3:
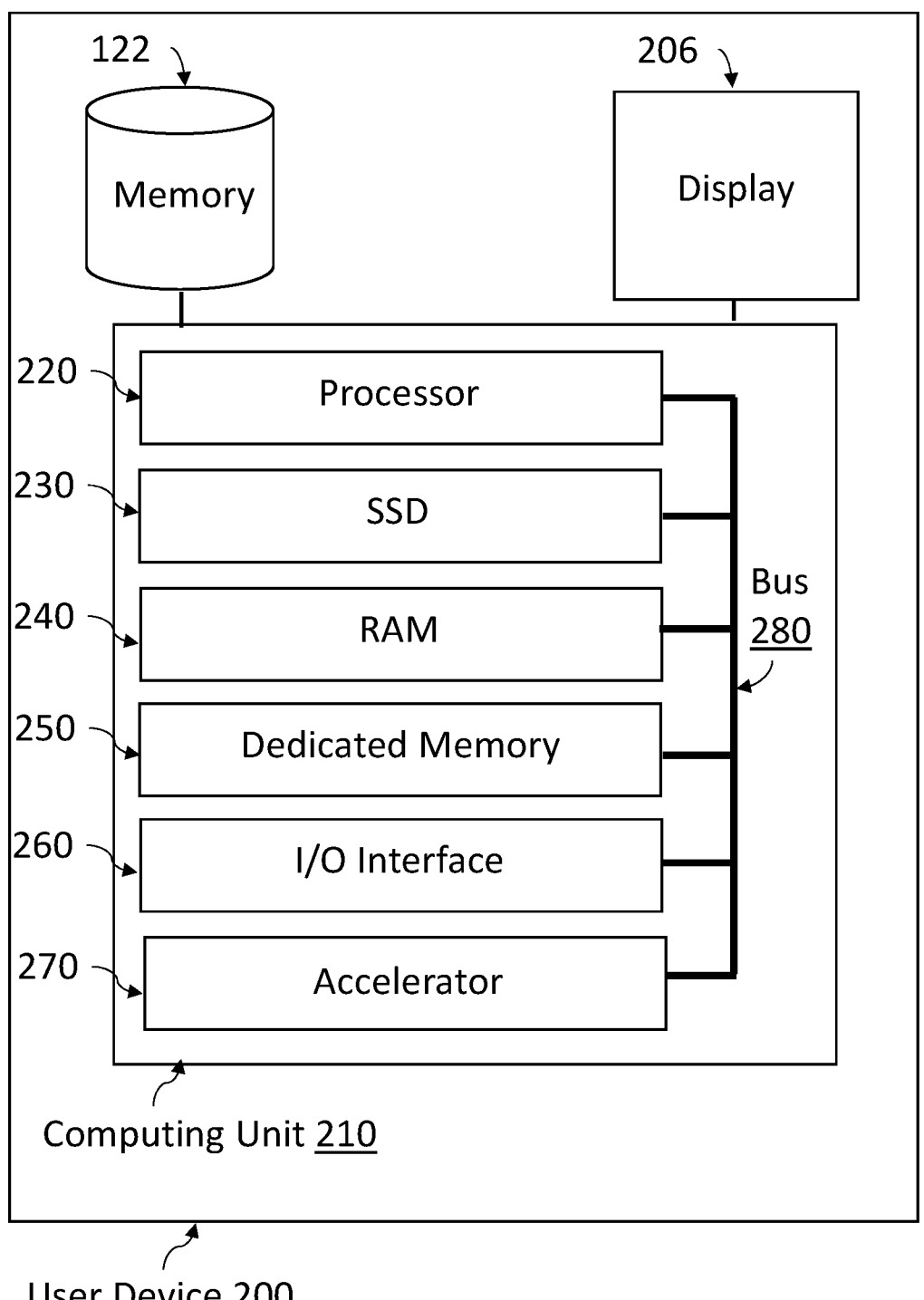
FIG. 3 is a schematic representation of a user device in accordance with an implementation of the present technology.

With additional reference to FIG. 3, the system 10 comprises at least one electronic device 200, the electronic device 200 being associated with a respective user. As such, the electronic device 200 can also be referred to as a "client device", "user device" or "client electronic device". It should be noted that the fact that the electronic device 200 is associated with a user does not need to suggest or imply any mode of operation—such as a need to log in, register, or the like. It should be appreciated that in other implementations, the data processing system 10 can include additional users and user devices.

The implementation of the user device 200 is not particularly limited. Depending on the implementation, the user device 200 could be implemented as a personal computer (desktops, laptops, netbooks, etc.), a wireless communication device (such as a smartphone, a cell phone, a tablet and the like), as well as network equipment (such as routers, switches, and gateways). The user device 200 comprises hardware and/or software and/or firmware (or a combination thereof), as is known in the art, to run the configuration file 500 and/or communicate with the data processing application 100. As such, the user device 200 of FIG. 3 may include any type of computing device that enables users to transmit to and receive information from the data processing application 100.

The user device 200 may be configured to execute the data processing application 100. To do so, the user device 200 comprises a computing unit 210 that may include various hardware components including one or more single or multi-core processors collectively represented by a processor 220, a solid-state drive 230, a RAM 240, a dedicated memory 250 and an input/output interface 260. The computing unit 210 may be a generic computer system.

The computing unit 210 may also be specifically dedicated to the implementation of the present technology. As a person in the art of the present technology may appreciate, multiple variations as to how the computing unit 210 is implemented may be envisioned without departing from the scope of the present technology.

Communication between the various components of the computing unit 210 may be enabled by one or more internal and/or external buses 280 (e.g. a PCI bus, universal serial bus, IEEE 1394 "Firewire" bus, SCSI bus, Serial-ATA bus, ARINC bus, etc.), to which the various hardware components are electronically coupled.

The input/output interface 260 may provide networking capabilities such as wired or wireless access. As an example, the input/output interface 260 may comprise a networking interface such as, but not limited to, one or more network ports, one or more network sockets, one or more network interface controllers and the like. Multiple examples of how the networking interface may be implemented will become apparent to the person skilled in the art of the present technology. For example, the networking interface could implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 230 stores program instructions suitable for being loaded into the RAM 240 and executed by the processor 220. Although illustrated as a solid-state drive 230, any type of memory may be used in place of the solid-state drive 230, such as a hard disk, optical disk, and/or removable storage media.

The processor 220 may be a general-purpose processor, such as a central processing unit (CPU) or a processor dedicated to a specific purpose, such as a digital signal processor (DSP). In some implementations, the processor 220 may also rely on an accelerator 270 dedicated to certain given tasks, such as executing the methods set forth in the paragraphs below. In some implementations, the processor 220 or the accelerator 270 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the user device 200 generally includes a screen or display 206 capable of rendering information comprised in the generated target dataset and/or an interface of the data processing application 100. In some implementations, display 206 could include and/or be housed with a touchscreen to permit users to input data via some combination of virtual keyboards, icons, menus, or other Graphical User Interfaces (GUIs). In some implementations, display 206 may be implemented using a Liquid Crystal Display (LCD) display or a Light Emitting Diode (LED) display, such as an Organic LED (OLED) display. The device may be, for example and without being limitative, a handheld computer, a personal digital assistant, a cellular phone, a network device, a smartphone, a navigation device, an e-mail device, a game console, or a combination of two or more of these data processing devices or other data processing devices.

The user device 200 may comprise a memory 122 communicably connected to the computing unit 210 and configured to store data, settings of the data processing application 100, or any other information relevant for communicating with the data processing application 100. The memory 122 may be embedded in the user device 200 as in the illustrated implementation of FIG. 3 or located in an external physical location. Information representative of the communication application 205 may be store in the memory 122. The computing unit 210 may be configured to access a content of the memory 122 via a network (not shown) such as a Local Area Network (LAN) and/or a wireless connexion such as a Wireless Local Area Network (WLAN).

The user device 200 may also includes a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

The user device 200 and the data storage services 50$_i$ are communicatively coupled over the communication network 20 via any wired or wireless communication link including, for example, 4G, LTE, Wi-Fi, or any other suitable connection. In some non-limiting implementations of the present technology, the communication network 20 may be implemented as the Internet. In other implementations of the present technology, the communication network 20 can be implemented differently, such as any wide-area communication network, local-area communication network, a private communication network and the like.

How the communication links between the user device 200 and the data storage services 50$_i$ are implemented will depend inter alia on how the user device 200 and the data storage services 50$_i$ are implemented. For example, in those implementations of the present technology where user device 200 are implemented as wireless communication devices (such as laptop), the communication link between the user device 200 and the data storage services 50$_i$ can be implemented as a wireless communication link (such as Wireless Fidelity, or WiFi® for short, Bluetooth® or the like) or wired (such as an Ethernet based connection). In those examples where one of the user device 200 is implemented as a smartphone, the corresponding communication link can be either wireless (such as but not limited to, a 3G communication network link, a 4G communication network link, Wireless Fidelity, or WiFi® for short, Bluetooth® and the like). The communication network 20 may comprise a plurality of communication networks such as private communication networks implemented as Intranets, and/or public communication networks, implemented as the Internet for example.

The communication network 20 is configured to transmit information and/or computer-readable instructions between the user device 200 and the data storage services 50$_i$. For example and without limitations, a request for accessing and retrieving a source dataset stored in the data storage services 50$_1$ may be generated by the user device 200 and further transmitted over the communication network 20 to one or more of the data storage services 50$_i$.

The data storage services 50$_i$ are communicatively coupled to the user device 200. Generally speaking, the data storage services 50$_i$ are configured to store data referred to as "source datasets" for temporary and/or permanent storage thereof and that may be accessed and retrieved by electronic devices such as the user device 200. For example, the data storage services 50$_i$ may store inter alia source datasets that may be used by the user device 200 to train a machine learning model. The data storage services 50$_i$ may be implemented by any computer-readable medium, including RAM, ROM, flash memory, magnetic or optical disks, optical memory, or other storage media. In this illustrative implementation, the data storage service 50$_3$ may be a cloud storage service for providing the user with storage capabilities such as AMAZON S3, MICROSOFT AZURE, OpenStack SWIFT or any other cloud storage architecture. Even though the data storage service 50$_3$ is depicted as being a single component in FIG. 2, it should be understood that the data storage service 50$_3$ may comprise, for instance, a plurality of storage devices such as servers for storing data objects or fragments of data objects. As such, functionalities of the data storage service 50$_3$ may be distributed between more than one device. For instance, source datasets stored to the data storage services 50$_i$ may be stored using known erasure coding technologies such that source datasets are fractioned into fragments, the fragments being spread and stored across different storage devices (e.g. different disks).

An access to source datasets distributed across the data storage services 50$_i$ may be private or public, depending on an implementation of a given data storage service 50$_i$. As an example, openml.org may be a public data storage service as data stored therein may be publicly accessed via the Internet. However, the user device 200 may also have access to private data storage services that store source datasets belonging to universities and/or research laboratories for example.

As is mentioned above, in some implementations of the present technology, the data processing application 100 can be implemented for executing the configuration file 500 described in more detail below. The data processing application 100 may be, for example and without limitations, an Application Programming Interface (API), a computer-readable program or a library. Referring back to FIG. 2, the data processing application 100 comprises a command module 110, an extracting module 120 and a retrieving module 130. In alternative implementation, the processor 220 may directly execute the instructions sets comprised in the configuration file 500 and thus may perform the tasks of the command module 110, the extracting module 120 and the retrieving module 130.

The command module 110 is configured to receive indications entered by the user. As set forth above, the data storage services 50$_i$ may be configured to, upon receiving the indications, identify different instruction sets for retrieving source datasets from the data storage services 50$_i$.

For example, an instruction for retrieving a source dataset D1 from the data storage service 50$_1$, referred to as Rep1, may be Rep1.get(D1), while an instruction for retrieving a source dataset D2 from the data storage service 50$_2$, referred to as Rep2, may be Rep2.download(D2). The two instructions are different because they relate to different data storage services. In this example, when the user desires to retrieve the source datasets D1 and D2 from Rep1 and Rep2 respectively, the user may transmit the following indication to the data processing application 200: Retrieve(D1 from R1; D2 from Rep2).

Upon receiving said indication, the command module 110 may identify, based on the indication, the instructions Rep1.get(D1) and Rep2.download(D2). In this illustrative example, the instructions to retrieve the source datasets D1 and D2 comprise a single instruction. However, a plurality of instructions may be identified and further executed to cause a retrieval of the source dataset in the target data format, thereby forming instruction sets.

In this implementation, the indication entered by the user may comprise one or more data requirement comprising conditions to be fulfilled by data of the source datasets for being retrieved. For instance, the data storage service $50_i$ may comprise images and text files. The indication entered by the user may comprise information causing a retrieval of the text files only. Additionally, in this implementation, the indication entered by the user may comprise one or more metadata requirement comprising conditions to be fulfilled by metadata of the source datasets for being retrieved. For instance, the indication entered by the user may comprise information causing a retrieval of the text files that have been updated after a given date only.

Notably, each source dataset and/or data storage service may be associated with a given data format. For instance, the data storage service "openml.org" may be associated with the .csv data format. Such associations between source datasets (or data storage services) and data formats may be stored under computer-readable format in the memory 122 of the user device 200 by the data processing application 100. Referring to the example above, the source datasets D1 and D2 may be associated with a data format F1 and F2 respectively. If the user desires to generate a target dataset based on the source dataset D1 and D2, and further desires that the target dataset has a target data format F0 such that, for instance, the target dataset is useable for training a machine learning model, the user may transmit the following indication to the data processing application 200: Retrieve(D1 from R1 in F0; D2 from Rep2 in F0). As such, the command module 110 may be configured to identify instructions to be executed to convert the retrieve source datasets D1 and D2 from F1 to F0, and from D2 to F0 respectively. Therefore, upon receiving the indication Retrieve(D1 from R1 in F0; D2 from Rep2 in F0), the command module 110 may identify the two following instruction sets S1 and S2:

S1: Rep1.get(D1); Convert(D1; F1; F0).
  S2: Rep2.download(D2); Convert(D2; F2; F0); where Convert(D, X, Y) is a pseudo-instruction which, upon being executed by a processor, cause a conversion of the data format X of the dataset D into the data format Y.

In other words, the command module 110 may be configured to receive indications comprising information from the user device 200 about source datasets to be retrieved from the data storage services $50_i$ under a selected data format, and further identify instruction sets for each data storage services $50_i$ involved in the indications, that may be executed to cause of retrieval of the source datasets. The instruction sets may be, for example and without limitation, stored in the memory 122 of the user device 200. An execution of said instruction sets may be performed by other modules of the data processing application 100.

The retrieving module 130 may execute portions of the instruction sets to retrieve the source datasets. More specifically, the retrieving module 130 may transmit signals to each of the data storage services that stores a source dataset to be retrieved, said signals being based on the instruction sets and transmitted over the communication network 20. As an example and without limitation, the retrieving module 130 may store the retrieved source datasets in the memory 122 of the user device 200.

The extracting module 120 may execute portions of the instruction sets to convert the retrieved source datasets from a corresponding source data format to the target data format selected by the user when determination is made that the source data format differs from the target data format. In the present disclosure, a conversion of the source data format encompasses file type conversion, data feature extraction, data formatting, style modifications, and any other data processing protocols that may be suitable for generating the target dataset. More specifically, the extracting module 120 may access retrieved source datasets stored in the memory 122 and execute portions of the instruction sets to convert data formats of the retrieved source datasets in the target data format, thereby forming the target dataset.

Referring back to the previous example, the retrieving module 130 may execute the instructions Rep1.get(D1) of the instruction set S1 and the instruction Rep2. download (D2) of the instruction set S2, and the extracting module 120 may execute the instructions Convert(D1; F1; F0) of the instruction set S1 and the instruction Convert(D2; F2; F0) of the instruction set S2.

As another example, a given one of the data storage services $50_i$ may be the software development kit (SDK) sklearn in which source datasets may be stored as binary files. The extracting module 120 may execute a file type conversion routine by retrieving a given binary file under a matrix format (e.g. numpy array) and converting said file into a csv data format file to be locally stored in the user device 200. As yet another example, a given one of the data storage services $50_i$ may be the datahub platform on which source datasets may be stored as json files associated with a source csv file. The extracting module 120 may thus execute a data formatting routine by retrieving a given source csv file and converts its data format into a "Dataset" format such that it may be locally stored in and used by the user device 200. In yet another non-limiting example, the extracting module 120 may convert character strings into integers which may further be processed by machine learning algorithms and/or fill empty variables of source datasets.

In another implementation, the data processing application 100 may be executed by an electronic device distinct from the user device 200, such as, for example and without limitation, a server (not shown) remotely connected to the user device 200. In this example, the user device 200 may transmit a request to the server for being provided with the target dataset, thereby causing the data processing application 100 of the server to retrieve and process the source datasets. The request may comprise the aforementioned indication entered by the user to identify the source datasets to be retrieved and/or the corresponding data storage services. The data processing application 100 may further retrieve and process the source dataset on a memory of the server, the memory being thus remotely connected to the user device 200, such that the target dataset is generated in the memory of the server. The server may further respond to the request received from the user device 200 by transmitting the target dataset to the user device 200. A deployment of the data processing application 100 in different electronic devices via a transmission of the configuration file 500 is described in greater details herein below.

In the present non-limiting implementation, computer-readable instructions for deploying and running the data processing application 100 by an electronic device such as the user device 200 may be compiled in the configuration file 500. In one implementation, the configuration file 500 is a YAML file. Other file type for the configuration are also contemplated in alternative implementations.

With reference to FIG. 4, the configuration file 500 will be described in more detail. As is mentioned briefly above, the configuration file 500 contains multiple sets of instructions to retrieve source datasets from one or more data storage services $50_i$ and convert the retrieved source datasets to a desired target file format.

More specifically, the configuration file 500 includes the instructions sets to be extracted and executed by the processor 220 of the user device 200 which received the configuration file 500. The configuration file 500 also includes information about the data storage services $50_i$ such as source datasets stored therein and data formats thereof. In the present implementation, the configuration file 500 includes a plurality of sections $510_i$. Each section $510_1$ includes information about a corresponding one of the data storage services $50_i$.

In the illustrated example, the section $510_1$ comprises information about a data format Data format 1 of the source datasets stored in the data storage service $50_1$, the section $510_1$ comprises information about data formats Data format 2 and Data format 3 of the source datasets stored in the data storage service $50_2$, and the section $510_3$ comprises information about a data format Data format 4 of the source datasets stored in the data storage service $50_3$. The data storage service $50_2$ stores a first group of source datasets whose data format is Data format 2, and a second group of source datasets whose data format is Data format 3. Indications may be provided in the configuration file 500 to identify which source datasets have the data format Data format 2, and which source datasets have the data format Data format 3. Such indications may be, for example and without limitation, identifiers of the source datasets.

In this implementation, each section $510_i$ of the configuration further includes the instruction set to be executed to retrieve the source dataset from their respective data storage services $50_i$ and convert there data format in the selected target data format to form the target dataset. In this example, the section $510_1$ comprises an instruction set Instruction set 1. The Instruction set 1 includes instructions to retrieve source datasets from the data storage service $50_1$ and convert the data format of the retrieved source datasets into any target data format that may be selected by the user of the user device 200. As an example, the Instruction set 1 may comprise the instructions Convert(D1; Data format 1; X) and Convert(D1; Data format 1; Y) such that the instruction Convert(D1; Data format 1; X) may be executed when the target data format selected by the user is X, and instruction Convert(D1; Data format 1; Y) may be executed when the target data format selected by the user is Y.

Similarly, the sections $510_2$ and $510_3$ respectively include instruction sets Instruction set 2 and Instruction set 3 comprising instructions to retrieve source datasets from the data storage services $50_2$ and $50_3$ respectively and convert the data format of the retrieved source datasets into any target data format that may be selected by the user of the user device 200.

In this implementation, the configuration file 500 further includes a settings section 520 for storing settings of the instruction sets set by the user of the user device 200. More specifically, the instructions of the different instruction sets that have been executed in response to an indication of the user may be stored in the settings section 520. For example, the settings section 520 may comprise the instructions Rep1.get(D1); Convert(D1; Data format 1; X); Rep2.download(D3); Convert(D3; Data format 3; X) when the indication from the user indicated that the source datasets D1 and D3 are to be retrieved under the target data format X to generate the target dataset.

As is described briefly above, the configuration file 500 may be transmitted to another user device with the settings section 520 comprising indication of instructions to be executed to generate a mirror image of the target data (i.e. contain a same logic collection of bytes). In other word, the target dataset may be generated on the other user device by executing the same instructions that caused a generation of the target dataset in the user device 200, as it will be described in greater detail herein further below.

In this implementation, the configuration file 500 is editable by the user of the user device 200 such that the user may generate additional section $510_i$ relative to other data storage services $50_i$, although this may not always be the case.

Figure 5:
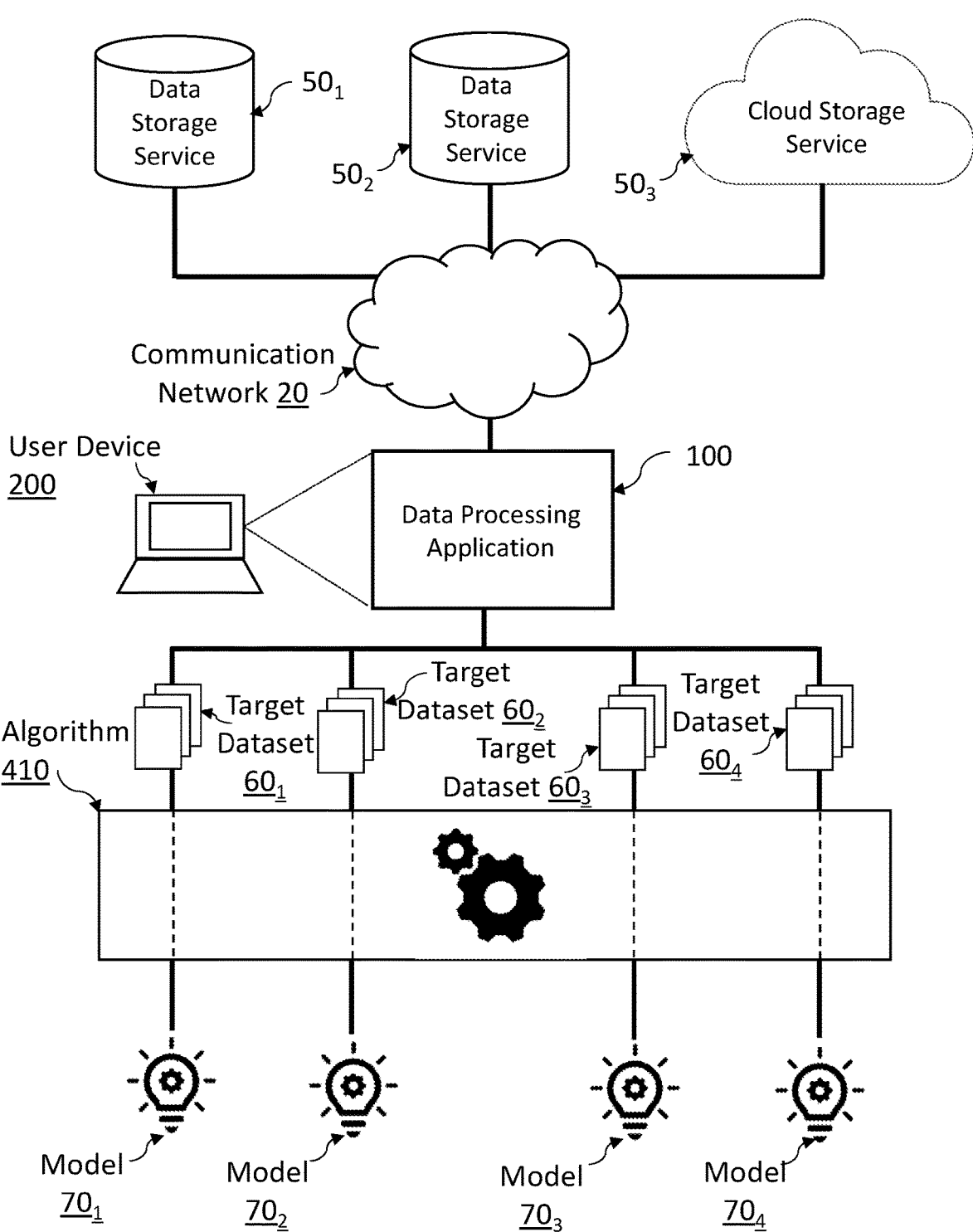
FIG. 5 is a schematic representation of the data processing system of FIG. 1 for training of a machine learning model in accordance with an implementation of the present technology.

FIG. 5 illustrates an implementation of the data processing system 10 of FIG. 1 for training a machine learning model in accordance with a non-limiting implementation of the present technology. In this implementation, the user of the user device 200 may enter an indication for generating a plurality of target datasets $60_i$ on the user device 200. Each target dataset $60_i$ is formed from one or more source datasets retrieved and processed using the configuration file 500. For example, the target dataset $60_1$ may be generated based on a first source dataset retrieved from the data storage service $50_1$ and a second source dataset retrieved from the data storage service $50_2$, and the target dataset $60_2$ may be generated based on a third source dataset retrieved from the data storage service $50_1$ and a fourth source dataset retrieved from the data storage service $50_2$. In this example, the first and third source datasets may be different and/or the second and fourth source datasets may be different.

As described herein above, the data processing application 100, according to the instructions of the configuration file 500, converts the data format of the retrieved source datasets to form the target datasets $60_i$. As such, the target datasets $60_i$ may be used as training datasets for training of a machine learning model based on an algorithm 410. In the illustrative example of FIG. 5, different trainings of the machine learning model may be performed using the data processing application 100, each training being based on one of the target datasets $60_i$ and providing a corresponding trained model $70_i$. More specifically, a training of the machine learning model with data comprised in the target dataset $60_1$ outputs the machine learning model $70_1$. Similarly, trainings of the machine learning model with data comprised in the target datasets $60_2$, $60_3$ and $60_4$ output the machine learning models $70_2$, $70_3$ and $70_4$ respectively. The algorithm 410 and/or the machine learning model may thus be benchmarked based on trainings with different target datasets generated from predetermined source datasets.

In the illustrative example of FIG. 5, only one machine learning model is trained based on a plurality of target datasets. Therefore, the target datasets $60_i$ generally have a same target data format, given that training of the machine learning model may be suitable with training dataset having a predetermined data format. Use of the configuration file 500 thus provides a simplified and more efficient process for accessing and using source datasets for training a machine learning model. The data processing application 100 may also be used to generate a plurality of target datasets having different target data formats such that a plurality of machine learning models may be trained simultaneously, each machine learning model being trained based on target datasets having a corresponding target data format.

Figure 6:
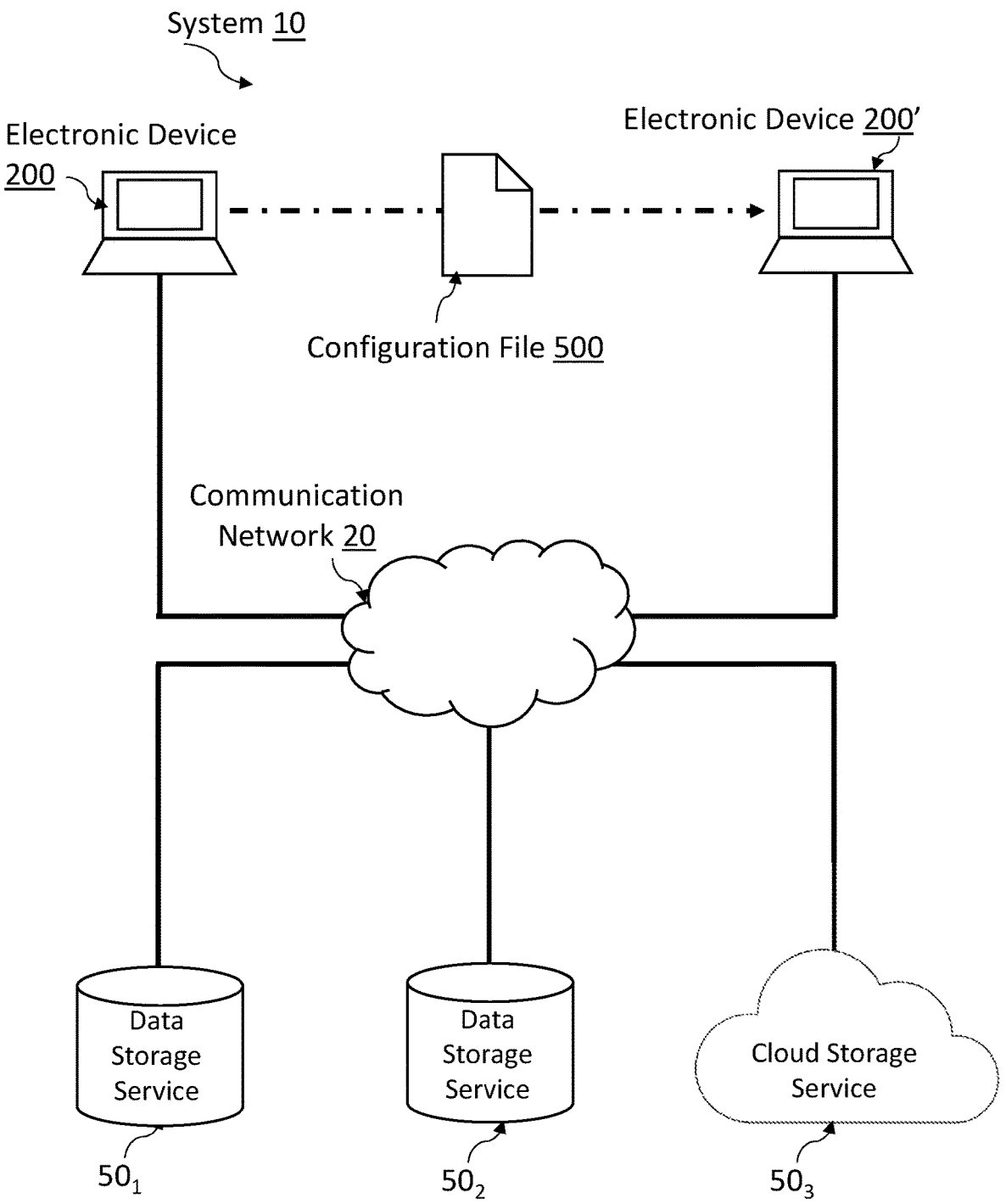
FIG. 6 is a schematic representation of the data processing system of FIG. 1 for collaborative purposes in accordance with an implementation of the present technology.

FIG. 6 illustrates the data processing system 10 of FIG. 1 for collaborative purposes in accordance with a non-limiting implementation of the present technology. In this implementation, the user device 200 is a first user device, the data processing system 10 further comprises a second user device 200'. The user device 200' is communicably connected to the data storage services $50_i$ via the communication network 20 such that it may retrieve source datasets therefrom.

In this implementation, the user device 200 transmits the configuration file 500 to the user device 200' over a communication channel. The communication channel may be the communication network 20, a secured dedicated channel, a transmission in person via a USB flash drive or any memory medium comprising the configuration file 500, or any other communication channel suitable for transmitting the configuration file 500.

Having received the configuration file 500, the user device 200' may execute instruction sets comprised in the configuration file 500 and retrieve target datasets based on source datasets distributed across the data storage services $50_i$. This allows the user device 200' to access and retrieve the source datasets using information acquired by the user of the user device 200 (specifically the retrieval path and conversion required) without the need to transfer the actual datasets between user devices.

More specifically, a processor of the second user device 200' may execute the instructions stored in the settings section 520 to generate the target dataset that was previously generated on the first user device 200. Generation of the target dataset is thus a reproducible generation given that the same instructions are executed by the first and second user devices 200, 200'. Moreover, collaboration between the first and second user devices 200, 2004 may be facilitated by the transmission of the configuration file 500. Indeed, the users of the first and second user devices 200, 200' may desire to share a target dataset from one to another (e.g. they may desire to obtain the target dataset on both first and second user devices 200, 200' for professional collaboration purposes). In this case, transmitting the configuration file 500 may be less time-consuming and less data-consuming than transmitting the target dataset from one of the first and second user devices 200, 200' to the other. Besides, a quality of data comprised in the target data source may be corrupted and/or unwillingly intercepted by a third party due to a transmission between the first and second user devices 200, 200'. Transmission of the configuration file 500 from the first user device 200 to the second user device 200' may thus enable the second user device 200' to directly and locally generate the target dataset, thereby improving a quality and privacy of the data comprised in the target data source.

With reference to FIG. 7, a method 700 for generating a target dataset having a target data format on the user device 200 according to some implementations of the present technology is illustrated in the form of a flowchart. In one or more aspects, the method 700 is performed by the processor 220 of the user device 200. In some implementations, one of more steps of the method 700 could be implemented, whole or in part, by another computer-implemented device. It is also contemplated that the method 700 or one or more step thereof may be embodied in computer-executable instructions that are stored in a computer-readable medium, such as a non-transitory mass storage device, loaded into memory and executed by a processor, such as the processor 220. Some steps or portions of steps in the flow diagram may be possibly being executed concurrently, omitted or changed in order.

The method 700 begins with accessing, at step 705, by the processor 220 of the user device 200, the configuration file 500. As is set out above, the configuration file 500 includes a plurality of instruction sets for retrieving a plurality of source datasets from the plurality of data storage services $50_i$. In this example, the plurality of source datasets is distributed across the plurality of data storage services $50_i$ and at least two of the plurality of source datasets have different data formats from each other. In one implementation, receiving the configuration file 500 by the user device 200 causes the processor 220 to deploy the data processing application 100 onto the user device 200. The instruction sets may comprise instructions to be executed to convert data formats of the plurality of source datasets.

The method 700 continues with receiving by the processor 220, at step 710, one or more indications from the user, the indication including a selection of at least one source dataset. In at least some implementations, the indication could include data requirements and/or metadata requirements, when metadata is made available to the user by a given data storage service $50_i$, defining the selection of the at least one source dataset. The data and metadata requirements may comprise conditions to be fulfilled by data and metadata respectively of the source datasets for being selected. For example, a given data storage service $50_i$ may comprise images, tuples and text files. Without limitation, an illustrative data requirement may comprise a condition fulfilled by tuples that do not comprise an empty value. The given data storage service $50_i$ may have metadata associated with the images, tuples and text files. Without limitation, an illustrative metadata requirement may comprise a condition fulfilled by images that have been updated after a given date only.

The indication generally also includes the target data format selected by the user among a plurality of data formats, the target data format corresponding to a data format of the target dataset to be generated. In some implementations, the target data format could be chosen at a different point in the method 700.

In at least some implementations, selecting the at least one source dataset from a given data storage service $50_i$ comprises selecting one of a plurality of source datasets stored in the given data storage service $50_i$. In other words, the user may select only some of source datasets that stored in the given data storage service $50_i$.

In at least some implementations, the user may enter a plurality of indications for generating a plurality of target datasets in parallel, each indication corresponding to a target dataset and comprising a selection of at least one source dataset for generation of the corresponding target dataset.

The method 700 continues with identifying by the processor 220, at step 715 and in response to receiving the at least one indication, at least one of the data storage services $50_i$ that stores the selected source datasets. Said identification may be based on the one or more indications. For instance, the user may specify in which data storage service $50_i$ the at least one source dataset is stored. In other instances, the user may only specify data requirements, metadata requirements and/or identifiers of source datasets such that the processor identifies the corresponding data storage service $50_i$ based on the configuration file 500.

The method 700 continues with extracting by the processor 220, at step 720, one or more instruction set of the plurality of instruction sets of the configuration file 500. The instruction set extracted corresponds to the selected source dataset. The instruction set generally includes instructions for retrieving the at least one source dataset and instructions for converting the data format of the at least one source dataset into the target data format indicated in the indication.

The method 700 then terminates with, at step 725, executing by the processor 220 the instruction set to form the target dataset, an execution of the instruction set causing a retrieval of the at least one source dataset. In this implementation, the execution of the at least one instruction set may further cause a conversion of the data format of the at least one source dataset. Such conversion of the data format encompasses file type conversion, data feature extraction, data formatting, style modifications, and any other data processing protocols that may be suitable for generating the target dataset. For example, a first instruction set may be executed to retrieve a first source dataset from one of the data storage services $50_i$, and a second instruction set may be executed to retrieve a second source dataset from another of the data storage services $50_i$. The first and second source datasets may have different data formats. Therefore, the execution of the first instruction set may retrieve the first source dataset and convert a first data format of the first source dataset into the target data format, and the execution of the second instruction set may retrieve the second source dataset and convert a second data format of the second source dataset into the target data format.

In one implementation, the at least one source dataset may be retrieved on an electronic device remotely connected to the user device 200. As such, a conversion of the data format of the at least one source dataset may be performed locally on the electronic device to generate the target dataset. In such an implementation, the electronic device may further transmit the target dataset to the user device 200. As such, the user device 200 does not receive the at least one source dataset before its data format has been converted. The user device 200 may further use the target dataset for training of a machine learning model, as illustrated in FIG. 5.

As an example and without limitation, a plurality of instruction sets may be executed for generating a plurality of corresponding target datasets, each target dataset being generated based on corresponding source datasets. The processor 220 may further use the plurality of target datasets to train a machine learning model, as described in FIG. 5.

The method 700 may further comprise transmitting, by the processor 220 to the second user device 200', the configuration file 500 such that the instruction sets are executable by a processor of the second user device 200' and, thereby, that a mirror image of the target dataset is generatable on the second user device 200'. As such, a user of the second user device 200' may enter at least one indication for generating at least one target dataset on the second user device 200' according to the previous steps of the method 700 described hereinabove. More specifically, for a same indication entered by the user of the user device 200 (or first user device 200) and the user of the second user device 200' (or second user device 200'), the instruction sets executed by the first and second user device 200, 200' are identical. As such, the target datasets generated on the first and second user device 200, 200' are identical (i.e. contain a same logic collection of bytes).

With reference to FIG. 8, a method 800 for generating the configuration file 500 for retrieving a plurality of source datasets for the user device 200 according to some implementations of the present technology is illustrated in the form of a flow chart. In one or more aspects, the method 800 or one or more step thereof may be performed by the processor 220 of the user device 200. In some implementations, one of more steps of the method 800 could be implemented, whole or in part, by another computer-implemented device. It is also contemplated that the method 700 or one or more step thereof may be embodied in computer-executable instructions that are stored in a computer-readable medium, such as a non-transitory mass storage device, loaded into memory and executed by a processor, such as the processor 220. Some steps or portions of steps in the flow diagram may be possibly being executed concurrently, omitted or changed in order.

The method 800 begins with identifying, at step 805, the plurality of data storage services $50_i$. The data storage services $50_i$ may comprise data storage devices, web repositories, data libraries, could storage architectures, or any other system that may comprise source datasets that the user of the user device may desire to retrieve. In this step and subsequent steps, "identifying" an entity may comprise using a mean for identifying said entity, such as storing an identifier of said entity in a memory (e.g. memory 122) by, for example, generating a computer-readable indication in the configuration file 500.

The method 800 continues with identifying, at step 810, a first data format of a first data storage service. In one implementation, the first data storage service may store a plurality of source datasets where at least two source datasets have different data formats from each other. For example, the at least two source datasets may have different file types, different data structures, different data features and/or different metadata structures. As such, each data format of source datasets stored in the first data storage service may be identified at this step.

The method 800 continues with identifying, at step 815, a second data format of a second data storage service. Similarly, in one implementation, the second data storage service may store a plurality of source datasets where at least two source datasets have different data formats from each other. As such, each data format of source datasets stored in the second data storage service may be identified at this step.

In at least some implementations, the method 800 could continue with identifying data formats of additional data storage services $50_i$.

The method 800 continues with generating, at step 820, a first instruction set, the first instruction set causing, upon being executed, a retrieval of at least one first source dataset from the first data storage service to the user device 200 and a conversion of the at least one first source dataset from the first data format to at least one target data format. The first instruction set may be, for example, the instruction set S1.

The method 800 continues with generating, at step 825, a second instruction set, the second instruction set causing, upon being executed, a retrieval of at least one second source dataset from the second data storage service to the user device 200 and a conversion of the at least one second source dataset from the second data format to the at least one target data format. The second instruction set may be, for example, the instruction set S2.

In at least some implementations, the method 800 could continue with generating additional instruction sets for additional data storage services $50_i$, each additional instruction set causing, upon being executed, a retrieval of at least one additional source datasets from a corresponding one of the additional data storage services $50_i$ and a conversion of the at least one additional source dataset from a respective data format to the at least one target data format.

The method 800 then terminates with storing, at step 830, the first and second instruction sets into the memory 122 of the user device 200 to form the configuration file 500. Other implementation where a different numbers of instruction sets are stored in the memory 122 to form the configuration file 500 are also contemplated.

In at least some implementations, the method 800 could further include, at step 835, providing access to the configuration file 500 to one more user devices, such as user devices 200, 200'. For example, the user of the user device

200 may transmit the configuration file 500 to the user device 200' via a communication channel (e.g. the communication network 20, in person via a USB flash drive, or any other suitable communication channel) such that the first and second instruction sets may be executed by a processor of the user device 200'.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every implementation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for sharing a source dataset between a first user device and a second user device, the method being executed by a first processor communicably connected to the first user device, the method comprising:
   receiving a request to initiate sharing of the source dataset;
   accessing a configuration file comprising a plurality of instruction sets, each instruction set enabling retrieval of one or more source datasets stored in a plurality of respective data storage services;
   receiving an indication from a user associated with the first user device, the indication identifying a selected source dataset stored in a corresponding selected data storage service from the respective data storage services, the indication including a metadata requirement, and the indication further identifying a target data format for the selected source dataset;
   storing, in the configuration file, settings corresponding to the indication from the user;
   extracting, from the configuration file, an instruction set corresponding to the selected source dataset and the settings;
   executing the extracted instruction set and the settings, and retrieving the selected source dataset from the selected data storage service onto the first user device, wherein retrieving the selected source dataset comprises selecting the source dataset according to the metadata requirement;
   providing the selected source dataset retrieved by the first user device to a first machine learning model for training thereof;
   sharing the selected source dataset by transferring the configuration file to the second user device to enable the second user device to, when executing the extracted instruction set, retrieve the selected source dataset from the selected data storage service in the target data format;
   extracting, from the configuration file and by a second processor communicably connected to the second user device, the instruction set corresponding to the selected source dataset and the settings;
   retrieving the selected source dataset from the selected data storage service onto the second user device by executing the extracted instruction set and the settings, wherein the selected source dataset retrieved by the second user device holds identical data as the selected source dataset retrieved by the first user device; and
   providing, by the second processor, the selected source dataset retrieved by the second user device to a second machine learning model for training thereof.

2. The method of claim 1, wherein the selected source dataset is a first selected source dataset from a first selected data storage service; and
   further comprising:
   retrieving, by the first processor, a second selected source dataset from a second selected data storage service onto the first user device;
   retrieving, by the second processor, the second selected source dataset from a second selected data storage service onto the second user device; and
   providing both of the first and second machine learning models with the second selected source dataset for training thereof.

3. The method of claim 1, wherein:
   the instruction set comprises instructions to, when executed, convert the selected source dataset, from a first data format into the target data format.

4. The method of claim 3, wherein converting the selected source dataset comprises at least one of:
   converting the selected source dataset into a desired file type; and
   converting the selected source dataset into a desired data formatting style.

5. The method of claim 1, wherein:
   the indication further includes a data requirement; and
   retrieving the selected source dataset from the selected data storage service comprises selecting the dataset according to the data requirement.

6. A system comprising a first user device and a second user device, wherein the first user device comprises at least one processor and memory comprising executable instructions which, when executed by the at least one processor of the first user device, cause the first user device to:
   receive a request to initiate sharing of a source dataset;
   access a configuration file comprising a plurality of instruction sets, each instruction set enabling retrieval of one or more source datasets stored in a plurality of respective data storage services;
   receive an indication from a user associated with the first user device, the indication identifying a selected source dataset stored in a corresponding selected data storage service from the respective data storage services, the indication including a metadata requirement, and the indication further identifying a target data format for the selected source dataset;
   store, in the configuration file, settings corresponding to the indication from the user;
   extract, from the configuration file, an instruction set corresponding to the selected source dataset and the settings;
   retrieve the selected source dataset from the selected data storage service by executing the extracted instruction set and the settings, wherein retrieving the selected source dataset comprises selecting the source dataset according to the metadata requirement;
   provide the selected source dataset retrieved by the first user device to a first machine learning model for training thereof; and
   send the configuration file to the second user device, and wherein the second user device comprises at least one processor and memory comprising executable instructions which, when executed by the at least one processor of the second user device, cause the second user device to:

receive the configuration file;

extract, from the configuration file, the instruction set corresponding to the selected source dataset and the settings;

execute the extracted instruction set;

retrieve the selected source dataset from the selected data storage service in the target data format by executing the extracted instruction set and the settings, wherein the selected source dataset retrieved by the second user device holds identical data as the selected source dataset retrieved by the first user device; and provide the selected source dataset retrieved by the second user device to a second machine learning model for training thereof.

7. The system of claim 6, wherein:

the instruction set comprises instructions to, when executed, convert the selected source dataset, from a first data format into the target data format.

8. The system of claim 7, wherein converting the selected source dataset comprises at least one of:

converting the selected source dataset into a desired file type; and converting the selected source dataset into a desired data formatting style.

9. The system of claim 6, wherein:

the indication further includes a data requirement; and wherein the instructions that cause the first user device to retrieve the selected source dataset from the selected data storage service comprise instructions that cause the first user device to select the dataset according to the data requirement.

10. The system of claim 6, wherein:

the indication further includes a metadata requirement; and wherein the instructions that cause the first user device to retrieve the selected source dataset from the selected data storage service comprise instructions that cause the first user device to select the dataset according to the metadata requirement.

\* \* \* \* \*